United States Patent
Joshi et al.

(10) Patent No.: US 6,171,100 B1
(45) Date of Patent: Jan. 9, 2001

(54) OXIDIZING OXYGEN-FUEL BURNER FIRING FOR REDUCING NOX EMISSIONS FROM HIGH TEMPERATURE FURNACES

(75) Inventors: Mahendra L. Joshi, Darien, IL (US); Benjamin J. Jurcik, Jr., St. Remy les Chevreus (FR); Jean-Francois Simon, Brussels (BE)

(73) Assignees: American Air Liquide, Inc., Walnut Creek, CA (US); L'Air Liquide Societe Anonyme pour l'Elude et l'Exploitation des Procedes George Claude, Paris (FR)

(*) Notice: Under 35 U.S.C. 154(b), the term of this patent shall be extended for 0 days.

(21) Appl. No.: 09/400,699

(22) Filed: Sep. 20, 1999

Related U.S. Application Data

(63) Continuation of application No. 09/031,977, filed on Feb. 26, 1998, now Pat. No. 5,954,498.

(51) Int. Cl.[7] ............................................. F23M 9/00
(52) U.S. Cl. ............................ 431/182; 431/186; 431/189
(58) Field of Search .................................. 431/8, 10, 12, 431/186, 187, 185, 188, 189, 350, 351, 354, 353

(56) References Cited

U.S. PATENT DOCUMENTS

| | | | |
|---|---|---|---|
| 1,165,835 | * 12/1915 | Birkholz | 431/188 |
| 1,166,451 | * 1/1916 | Dreffein et al. | 431/188 |
| 3,934,522 | * 1/1976 | Booker | 431/186 |
| 4,531,960 | 7/1985 | Desprez . | |
| 5,100,313 | * 3/1992 | Anderson et al. | 431/8 |
| 5,158,590 | 10/1992 | Jouvaud et al. . | |
| 5,411,393 | * 5/1995 | Askin et al. | 431/186 |
| 5,490,775 | * 2/1996 | Joshi et al. | 431/187 |
| 5,620,316 | * 4/1997 | Duboudin et al. | 431/187 |

FOREIGN PATENT DOCUMENTS

| | | |
|---|---|---|
| 0127513 | 12/1984 | (EP) . |
| 0340424 | 11/1989 | (EP) . |
| 0447300 | 9/1991 | (EP) . |
| 0571984 | 12/1993 | (EP) . |

* cited by examiner

*Primary Examiner*—James C. Yeung
(74) *Attorney, Agent, or Firm*—Jeffrey L. Wendt

(57) ABSTRACT

Burner firing method and device are presented where an oxidizing oxygen-fuel burner is fired at an angle to the reducing air-fuel burner flame to reduce overall NOx emissions from high temperature furnaces. The oxidizing oxy-fuel burner stoichiometric equivalence ratio (oxygen/fuel) is maintained in the range of about 1.5 to about 12.5. The reducing air-fuel burner is fired at an equivalence ratio of 0.6 to 1.00 to reduce the availability of oxygen in the flame and reducing NOx emissions. The oxidizing flame from the oxy-fuel burner is oriented such that the oxidizing flame gas stream intersects the reducing air-fuel flame gas stream at or near the tail section of the air-fuel flame. The inventive methods improve furnace temperature control and thermal efficiency by eliminating some nitrogen and provide an effective burnout of CO and other hydrocarbons using the higher mixing ability of the oxidizing flame combustion products. The simultaneous air-fuel and oxy-fuel burner firing can reduce NOx emissions anywhere from 30% to 70% depending on the air-fuel burner stoichiometric ratio.

3 Claims, 2 Drawing Sheets

OXIDIZING BURNER CONSTRUCTION FOR UNDERPORT INJECTION

OXYGEN ENRICHED COMBUSTION METHOD

OXIDIZING OXYGEN-FUEL BURNER FIRING FOR REDUCING NOx EMISSIONS

OXIDIZING BURNER CONSTRUCTION FOR UNDERPORT INJECTION

OXIDIZING BURNER FOR THROUGHPORT APPLICATION

OXIDIZING OXYGEN-FUEL BURNER FIRING FOR REDUCING NOX EMISSIONS FROM HIGH TEMPERATURE FURNACES

This application is a continuation, of application Ser. No. 09/031,977, filed Feb. 26, 1998 (which is incorporated herein by reference in its entirety, U.S. Pat. No. 5,954,498).

BACKGROUND OF THE INVENTION

1. Field of the Invention

This invention pertains to methods and apparatus for introducing an oxidizing oxygen-fuel combustion in air-fuel fired furnaces to reduce NOx emissions and improve thermal efficiency without any substantial detrimental effect on furnace life or product quality.

2. Related Art

The most common method to reduce NOx emissions is to use 100% oxygen-fuel combustion where use of oxygen instead of air eliminates nitrogen and thus significantly lower NOx emissions are achieved. This method has been successfully used on several types of glass furnaces. However, the use of 100% oxygen-fuel firing on large glass furnaces (450 to 1000 ton/day melted glass production capacity), such as float glass furnaces, has not been achieved so far due to overall economics with the oxygen use and uncertainty over glass quality and furnace life.

There are several other NOx control methods available in the market such as 3-R process (European Patent No. 0 599 547 A1), gas reburn process (U.S. Pat. No. 5,139,755) and oxygen-enriched air staging (U.S. Pat. No. 5,203,859).

The 3-R process and the gas reburn process use additional or reburn fuel injection (5% to 15% of total fuel use) in the exhaust stream to create gas reburn reactions and reduce NOx emissions. This is a post combustion method. This method requires injecting reburn fuel (natural gas) in the exhaust stream, which may be difficult for certain furnaces which cannot use reducing conditions in the regenerator due to refractories containing various oxides. Further the reburn fuel is an energy penalty and no thermal efficiency benefit is derived by injection of 5% to 15% reburn fuel in the exhaust stream outside the melt area. Here the additional fuel does not release any heat for the productivity increase and it is simply used as emissions cleaning medium. There are also concerns of higher CO emissions from the furnace.

In oxygen-enriched air staging, the secondary oxidant (oxygen or oxygen-enriched air) is introduced proximate to the exhaust of the industrial furnace to reduce NOx emissions. In these applications the furnace is operated using lower stoichiometry on the firing side to reduce thermal NOx formation. The secondary oxidant is injected into the exhaust stream (using exhaust port) to burnout CO and hydrocarbons. This concept is illustrated in FIG. 1. In FIG. 1 a typical side fired regenerative furnace 1 having regenerators (checkers) A and B is illustrated schematically with both firing 2 and exhaust 4 ports. The firing is from left-to-right and secondary oxidant injection 6 is from right-to-left.

In U.S. Pat. No. 5,203,859 (as illustrated in FIG. 1), the preferred embodiment includes withdrawal of preheated secondary combustion air 7 from firing side regenerator using an oxygen aspirator 8. The oxygen is used as a prime mover for withdrawing secondary combustion air 7. The secondary oxidant 6 is then injected proximate to the exhaust 4. The disadvantages of above scheme include:

Space constraints due to large secondary air piping 7 carrying 2400° F. [1315° C.] air.

Complex flow reversal cycle to switch secondary preheated air from left-to-right side depending on the reversal cycle.

Difficulties in the burnout of CO and hydrocarbons in the melter space due to premature combustion in the exhaust port 4 leading to overheating of exhaust port 4.

Design limitations of aspirator 8 in providing correct secondary oxidant mixture High capital cost system.

Other known embodiments of the above include secondary oxidant as oxygen-enriched ambient air, which would create difficult mixing conditions due to smaller relative volume of the cold or ambient oxidant stream compared to primary exhaust stream. Here the exhaust gas volume is approximately 60 times greater than the secondary oxidant leading to inefficient mixing and poor thermal efficiency due to quenching of the melter combustion space by an ambient mixture. This can further result in poor product quality.

Additional known embodiments include use of oxygen as a secondary oxidant, which also creates difficult mixing conditions due to small gas volume (300 times smaller than the primary exhaust stream). This creates non-homogeneous burnout and creation of hot spots in the melter combustion space and exhaust port.

It would be a great benefit to glass and other manufacturers if NOx production could be decreased, while transferring heat to the load and avoiding some of the problems mentioned above.

SUMMARY OF THE INVENTION

In accordance with the present invention the above limitations are largely overcome using a much simpler approach for NOx reduction.

A first aspect of the invention is a method of heating a load in a furnace, the method comprising the steps of:

a) combusting a first fuel in at least one air-fuel burner, heat from the air-fuel burner being substantially transmitted to the load;

b) combusting a second fuel in at least one oxy-fuel burner, heat from the oxy-fuel burner being substantially transmitted to the load; wherein the air-fuel burner is operated in fuel-rich mode, and the oxy-fuel burner is operated in fuel-lean mode.

Preferred are methods wherein the combusting of step (a) creates an air-fuel flame that is substantially parallel to a horizontal surface of a load; wherein the combusting of step (b) creates an oxy-fuel flame that intersects the air-fuel flame; wherein the oxy-fuel flame projects from a flat bottom port toward the air-fuel flame at an angle α measured from horizontal, the angle α, ranging from about 1° to about 30°; methods wherein the oxy-fuel flame projects from below the air-fuel flame; and methods wherein the oxy-fuel flame intersects the air-fuel flame near a tail of the air-fuel flame.

Other preferred methods in accordance with the invention are those wherein the oxy-fuel flame projects from inclined ports toward the air-fuel flame at an angle α, measured from horizontal ranging from about −10 to about 30°; methods wherein multiple oxy-fuel burners are present for each air-fuel burner; and methods wherein the first and second fuels are the same.

A second aspect of the invention is a method of temperature control in a furnace heating a load, the furnace having both air-fuel burners and oxy-fuel burners, said method comprising the steps of:

a) operating one or more air-fuel burners at constant fuel input; and b) operating one or more oxy-fuel burners to increase or decrease temperature of the load without substantially changing production of NOx from the furnace.

A third aspect of the invention is an oxy-fuel burner comprising:

a) a central conduit adapted to deliver an oxidant;

b) an annular region external of the central conduit, the annular region adapted to deliver a fuel;

c) the central conduit having a nozzle attached at a central conduit end, wherein either the nozzle or the central conduit are adapted to be adjusted axially.

Preferred burners in accordance with this aspect of the invention are those wherein the central conduit has an oxidant exit end, and the burner annular region is defined by a refractory nozzle, the refractory nozzle having a furnace hot face, the oxidant exit end being positionable from the furnace hot face by a distance ranging from about D/4 to about 10D, wherein D is a diameter of a burner flame exit region.

The inventive methods are preferred for regenerative or recuperative glass furnaces which are known to produce high (thermal) NOx emissions due to the high flame temperatures and large availability of nitrogen in the atmosphere. The high flame temperatures arise from the higher combustion air preheat temperatures (1200° F. to 2400° F.) [649° C. to 1315° C.] and higher process temperatures (2700° F. to 2900° F.) [1482° C. to 1593° C.]. The nitrogen is available because the typical oxidant is air (~79% nitrogen).

DESCRIPTION OF PREFERRED EMBODIMENTS

Figure 1:
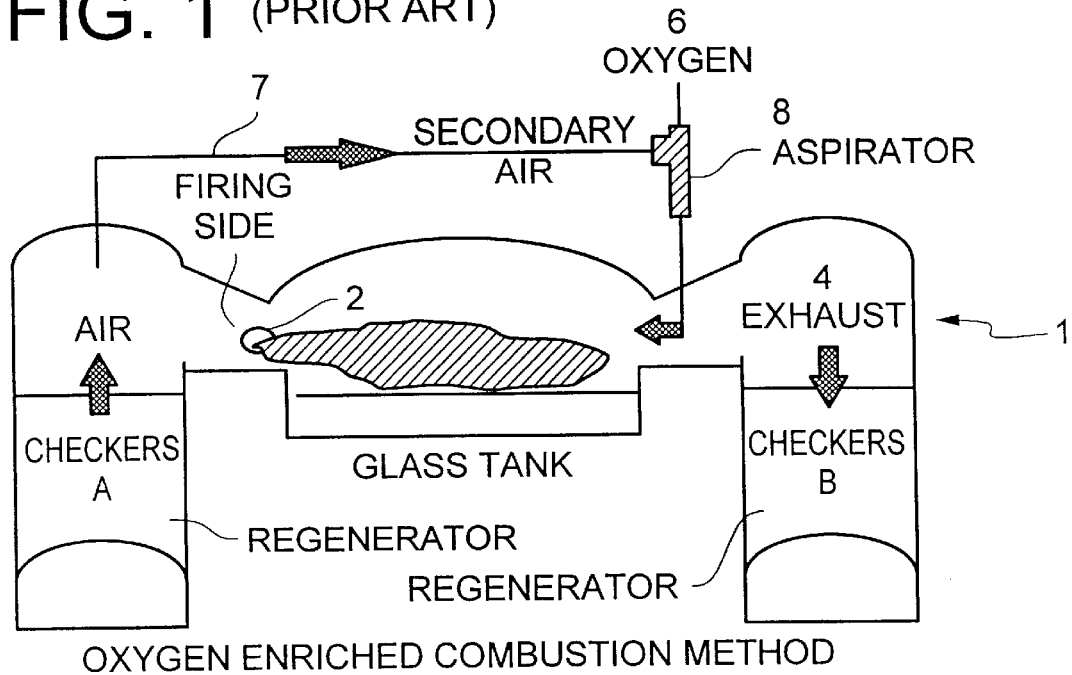
FIG. 1 is a schematic drawing of a prior art side fired regenerative furnace.
Figure 2:
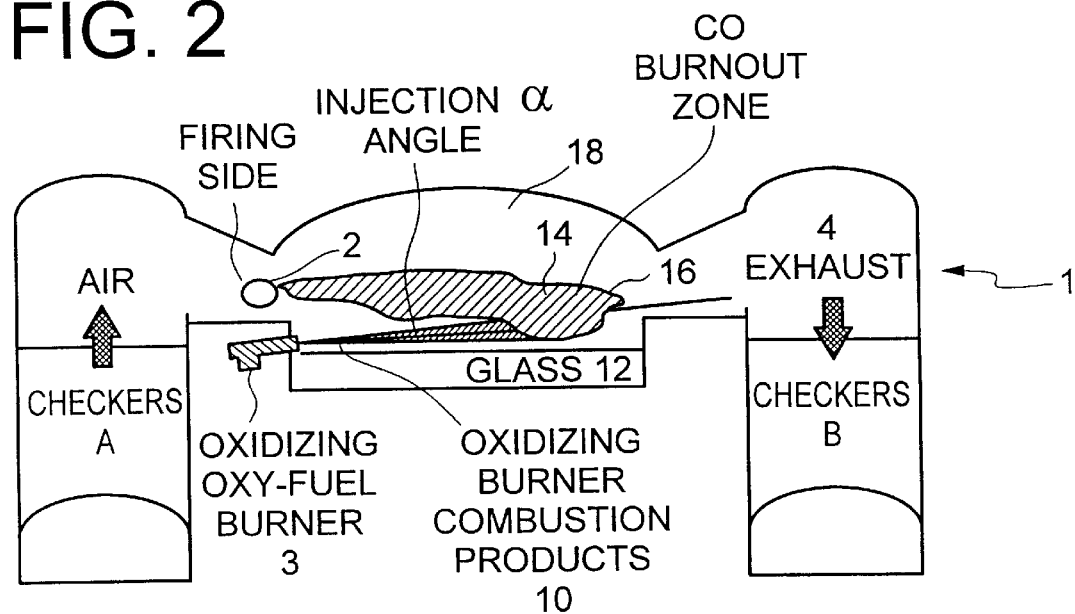
FIG. 2 is a schematic drawing of a modified side fired regenerative furnace employing a preferred method of the invention.

FIG. 2 illustrates schematically a preferred method of firing an oxidizing oxy-fuel burner at an angle to the air-fuel flame on the firing side. The burner equivalence ratio (ratio of actual oxygen flow rate to fuel flow rate/theoretical ratio of oxygen flow rate to fuel flow rate for complete combustion to $CO_2$ and $H_2O$) is kept on oxidizing side in the range of about 1.5 to about 12.5. A theoretically correct ratio for combustion is an equivalence ratio of 1.

FIG. 2 illustrates schematically a side fired regenerative furnace 1 where primary air-fuel burners 2 are in side-of-port firing configuration and the oxidizing oxy-fuel burner 3 of the invention is in underport firing configuration. As used herein, "oxy-fuel" means an oxidant having greater than 21% oxygen, including oxidants having 22 to 100% oxygen, more preferably from about 22 to about 30% oxygen. Also, while the description focus is on glass production, the methods and apparatus of the invention are applicable to melting metals and other materials, such as ores. Other primary burner firing configurations and suggested oxidizing oxy-fuel burner locations will be discussed herein. One advantage of the proposed oxidizing burner firing is to provide oxy-fuel combustion over the glass melt surface to transfer radiative heat to the glass melt surface 12 coupled with generation of oxidizing oxy-fuel burner combustion products 10 mainly preheated (1500° F. to 4500° F.) [815° C. to 2482° C.] oxygen, CO2, and H2O. The expansion of hot oxygen can be anywhere from 4 to 10 times the volume of the cold oxygen used in previous methods. Further, the introduction of non-NOx producing gases such as $CO_2$ and $H_2O$ with preheated oxygen allows effective carrier medium. The non-NOx producing gases improves mixing with the exhaust stream due to larger effective mass of the oxidizing medium. It has also been proven that the radiative heat transfer is greater using $H_2O$ and $CO_2$ (due to higher partial pressures) compared to mostly air used in previous known methods using oxygen-enriched combustion. The inventive methods have additional advantages in changing the amount of oxygen in the oxidizing gas stream by simple adjustment of firing stoichiometric ratio.

The underport firing angle (herein designated $\alpha$) is kept very small to have oxidizing burner combustion products 10 intersect air-fuel flame gases 4 in the tail section 16 of the air-fuel flame. A preferred range of this angle $\alpha$ for the flat bottom port ranges from 1° to about 30° upward from the horizontal plane (or molten glass or other product surface). For the slope bottom (inclined) ports the angle can be anywhere from −10° (downward) to 30° (upward) from the glass surface. The idea here is to inject an oxidizing stream "deep" into the furnace without premature mixing with the primary air-fuel flame. The choice of oxidizing burner firing rate, stoichiometry, fuel and oxidant injection velocities, nozzle design, injection angle $\alpha$ and number of oxidizing burners will determine the overall mixing and CO burnout efficiency.

For large float glass furnaces, where port widths are significant (say 3 feet to 9 feet wide ports) [say 1 meter to 3 meter wide ports], several or multiple oxidizing burners in the underport configuration may be preferred. The spacing between adjacent oxidizing burners is optimized to provide good mixing and penetration. Computer modeling of air-fuel flame velocity profile and various parameters of oxidizing burner flame momentum is preferably performed to optimize the number, spacing and firing rate of oxidizing burners for a given furnace and port geometry. Too much penetration can cause burnout in the opposite exhaust port and too little penetration can cause premature mixing in the hot flame zone (peak flame temperatures) and possible increase in NOx emissions. The design goal is to intersect air-fuel flame tail section 16 with the highly oxidizing burner combustion products 10 and create good CO burnout in the melter space (generally above the load). In this configuration the burnout and heat release takes place inside the melter and heat is released to the load. The energy release within the melter in accordance with the present invention is in contrast to the 3-R process where a reburn fuel is injected in the regenerator and heat of combustion of this reburn fuel is not directly used for the melting process. Excessive penetration can cause burnout in the exhaust port and resulting heat release inside the exhaust port can overheat exhaust port refractory and subsequent overheating of regenerator target wall and checkers. The underport injection angle $\alpha$ for the oxidizing burner is also preferably decided very carefully using computer modeling to avoid impact on crown 18 or other furnace refractories.

The oxidizing burner flame momentum is calculated based on:

Firing rate
Equivalence ratio (stoichiometry)
Fuel velocity
Oxidant velocity
Number of oxidizing burners per port
Injection angle
Nozzle design (straight or swirl geometry)

An optimum momentum will provide a good burnout of CO and other hydrocarbons in the air-fuel flame and effective heat release over the load surface. The overall advantages are reduced NOx emissions (due to lower equivalence ratio of air-fuel flame) from the furnace and higher thermal efficiency. The NOx reductions will be always proportional to the level of air-fuel equivalence ratio. If the firing port air-fuel equivalence ratio is very low, say 0.7 to 0.8, the NOx reductions can be very high, for example from 60% to 70%. Conversely, if the air-fuel equivalence ratio is high, for example from 0.95 to 1.00, the NOx reduction will be low, from 10% to 30% from the baseline operation using equivalence ratio of 1.05. The equivalence ratio of 1.05 means 5% excess air and it is about 1% excess oxygen in the exhaust port. Normally regenerative furnaces operate at equivalence ratio ranging from about 1.05 to about 1.10.

The selection of air-fuel equivalence ratio will depend on overall furnace operation, furnace design, port size, overall flame characteristics and amount of NOx reduction desired. The selection of oxidizing burner stoichiometry will depend on the air-fuel burner equivalence ratio and the level of excess oxygen required into the exhaust gases. The preferred practice is to have about 1% to 2% excess oxygen in the exhaust port of large regenerative side fired furnaces.

The firing rate selection of oxidizing burner is performed based on total energy input required for the given port and air-fuel flame equivalence ratio. Preferably from about 5% to about 50% of total fuel requirement for the given port can come in the form of oxidizing burner fuel input. The air-fuel burner fuel input is proportionately reduced and it is diverted to the oxidizing burner. By utilizing one or more oxidizing burners there can be fuel savings (up to 10%) in high preheat temperature combustion systems (air temperature 2200° F. to 2300° F.) [air temperature 1204° C. to 1260° C.] and thus the overall fuel consumption per port can be lower due to improved heat transfer from fuel-rich, luminous air-fuel flame, and partial elimination of combustion air (nitrogen) from air-fuel combustion.

Additional advantages of the invention are reduced particulates or carryover from the furnace due to reduced flue volume. Many regenerators using previously known methods are partially plugged due to process particulates and extended campaign. The use of oxidizing burners can be beneficial since reduction of flue volume can allow full capacity firing for achieving required production rate without exceeding regenerator flow capacity limitations or pressure increase.

Table I and 1A show various air-fuel burner stoichiometric levels and the oxidizing oxy-fuel burner stoichiometric settings for obtaining significant NOx reduction. For example, in one embodiment the air-fuel burner is fired at a constant firing rate of 10 MM Btu/Hr [2.92 MW]. Here it is assumed that the overall fuel requirement for the port is 11 MM Btu/Hr [3.22 MW]. The oxidizing burner is fired at constant energy input at 1 MM Btu/Hr [293 KW]. In the real situation, there can be multiple oxidizing burners depending on the port width dimension.

The corresponding flows of combustion air at various equivalence ratios, oxidizing oxy-fuel burner natural gas and oxygen flows, composition of oxidizing burner combustion products and the equilibrium temperature before interaction with the exhaust stream are given. The overall objective is to provide sufficient secondary oxidant to enable maintaining a desired excess oxygen level in the exhaust stream.

TABLE I

| Equi. Ratio | Comb. Air (scfh) | Comb. Air O$_2$ Content (scfh) | Required O$_2$ Content for 2% Excess O$_2$ (scfh) | Oxidizing Burner NG Flow (scfh) | Oxidizing Burner O$_2$ Flow (scfh) | Oxidizing Burner Equi. Flame Temp. (° F.) | CO$_2$ (%) | O$_2$ (%) | H$_2$O (%) | Oxidizing Burner Oxygen Addition (scfh) |
|---|---|---|---|---|---|---|---|---|---|---|
| 0.7 | 70,000 | 14,700 | 8,400 | 1,000 | 10,000 | 3,414 | 9.0 | 72.7 | 18.2 | 8,000 |
| 0.8 | 80,000 | 16,800 | 6,300 | 1,000 | 8,000 | 3,846 | 11.0 | 66.8 | 21.0 | 6,028 |
| 0.95 | 95,000 | 19,950 | 3,150 | 1,000 | 5,000 | 4,487 | 16.7 | 50.0 | 33.3 | 3,000 |

TABLE IA (S.I. Units)

| Equi. Ratio | Comb. Air (nM$^3$/hr) | Comb. Air O$_2$ Content (nM$^3$/hr) | Required O$_2$ Content for 2% Excess O$_2$ (nM$^3$/hr) | Oxidizing Burner NG Flow (nM$^3$/hr) | Oxidizing Burner O$_2$ Flow (nM$^3$/hr) | Oxidizing Burner Equi. Flame Temp. (° C.) | CO$_2$ (%) | O$_2$ (%) | H$_2$O (%) | Oxidizing Burner Oxygen Addition (nM$^3$/hr) |
|---|---|---|---|---|---|---|---|---|---|---|
| 0.7 | 1,844 | 387 | 221 | 26 | 263 | 1,879 | 9.0 | 72.7 | 18.2 | 211 |
| 0.8 | 2,108 | 442 | 166 | 26 | 211 | 2,119 | 11.0 | 66.8 | 21.0 | 159 |
| 0.95 | 2,503 | 525 | 83 | 26 | 131 | 2,475 | 16.7 | 50.0 | 33.3 | 79 |

In Table I [Table 1A is in SI units], the equivalence ratio of 1.00 is theoretically correct combustion air and cases involving 0.7, 0.8 and 0.95 are for rich combustion cases. It is shown here that by simple selection of oxidizing burner firing rate (1 MM Btu/Hr here) [293 KW] and overall stoichiometric ratio, a desired oxygen content can be introduced into the air-fuel flame tail section. In addition, the equilibrium temperature of products of combustion from the oxidizing burner can be adjusted by choosing the stoichiometric ratio.

In Tables I and 1A, the total fossil fuel firing rate is 11 MMBTU/Hr [3.22 MW] for all of the cases considered (10 MMBTU/Hr [2.93 MW] in the air-fuel burner and 1 MMBTU/Hr [293 KW] in the oxidizing burner). The thermal efficiency and NOx formation of the air-fuel burner and oxidizing burner can be enhanced by adjusting the balance between the fossil fuel firing rate in the air-fuel burner, and the fossil fuel rate in the oxidizing burner, as well as adjusting the equivalence ratio of the oxidizing burner. Typically, the thermal efficiency of the system will increase as the oxidizing burner equivalence ratio is increased at constant fossil fuel firing rate.

Table II [Table IIA is in SI units] gives a range of oxidizing burner stoichiometric ratio, calculated equilibrium gas composition and the equilibrium flame temperature. This data can be used as a guideline for selecting oxidizing burner flows for the field application. In a real situation, slightly more oxygen is required due to inefficient mixing process. In any case the introduction of hot or preheated oxygen supplied by the oxidizing burner can produce efficient combustion of CO and other hydrocarbons within the combustion space or melter without worrying about post combustion in the exhaust port and overheating of the exhaust port. Further, the heat released by oxidizing flame is over the significant glass melting surface and not concentrated near the exhaust port. This is additional advantage over simple oxidation of CO and other hydrocarbons near the exhaust port. Further, the invention process does not introduce excess nitrogen in the furnace due to oxy-fuel combustion compared to previous oxygen-enriched air combustion methods such as disclosed in U.S. Pat. No. 5,203,859.

TABLE II

Oxidizing Burner Products of Combustion

| S.R. ($O_2$/Fuel Ratio) | % Fuel by Volume in $O_2$ | $CO_2$ (%) | Oxygen (%) | $H_2O$ (%) | Equilibrium Temp. (° F.) |
|---|---|---|---|---|---|
| 5 | 20 | 16.67 | 50.00 | 33.33 | 4,487 |
| 8 | 12.5 | 11.04 | 66.83 | 21.86 | 3,846 |
| 10 | 10 | 9.09 | 72.73 | 18.18 | 3,414 |
| 12.5 | 8 | 7.37 | 77.87 | 14.58 | 2,940 |
| 15 | 6.66 | 6.25 | 81.25 | 12.5 | 2,568 |
| 17 | 5.88 | 5.53 | 83.39 | 10.94 | 2,328 |
| 19.6 | 5.10 | 4.85 | 85.44 | 9.71 | 2,321 |
| 25 | 4 | 3.83 | 88.50 | 7.58 | 1,707 |

TABLE IIA (S.I. Units)
Oxidizing Burner Products of Combustion

| S.R. ($O_2$/Fuel Ratio) | % Fuel by Volume in $O_2$ | $CO_2$ (%) | Oxygen (%) | $H_2O$ (%) | Equilibrium Temp. (° C.) |
|---|---|---|---|---|---|
| 5 | 20 | 16.67 | 50.00 | 33.33 | 2,475 |
| 8 | 12.5 | 11.04 | 66.83 | 21.86 | 2,119 |
| 10 | 10 | 9.09 | 72.73 | 18.18 | 1,879 |
| 12.5 | 8 | 7.37 | 77.87 | 14.58 | 1,615 |
| 15 | 6.66 | 6.25 | 81.25 | 12.5 | 1,409 |
| 17 | 5.88 | 5.53 | 83.39 | 10.94 | 1,275 |
| 19.6 | 5.10 | 4.85 | 85.44 | 9.71 | 1,271 |
| 25 | 4 | 3.83 | 88.50 | 7.58 | 930 |

Tables II and IIA give various embodiment settings of oxidizing burner for operation on regenerative furnaces. The oxidizing burner stoichiometric ratio can be tailored to suit the air-fuel burner equivalence ratio.

The inventive aspects can be summarized as follows:

Use of oxidizing oxygen-fuel burner in the regenerative furnace to reduce NOx emissions.

Simultaneous firing of fuel-rich air-fuel burners and fuel-lean oxy-fuel oxidizing burners to reduce NOx emissions. This technique takes advantage of two NOx reduction processes, a fuel-rich air-fuel combustion process, and a fuel-lean oxy-fuel combustion process, which are key in reducing NOx emissions, while maintaining the overall oxygen to fuel stoichiometry similar to the baseline firing, without a loss of thermal efficiency and potentially a gain.

Use of one or more oxygen-fuel burners to inject oxidizing combustion products deep into the combustion chamber for burnout of CO and other hydrocarbons. The ability of the oxidizing burner to inject the highly oxidizing combustion products deep into the combustion chamber is improved over a simple oxygen lance. The oxy-fuel combustion process increases temperature and volume of the gases and creates a propulsive force to push oxidizing combustion products into the combustion chamber.

Use of novel oxidizing burner firing configurations (firing locations, firing angles, number of oxidizing burners) to enable burnout of CO and other hydrocarbons.

A new combined air-fuel and oxy-fuel firing concept where oxidizing oxy-fuel firing can be used as a basic process temperature control device by keeping the level (or percent of fuel input) of air-fuel firing constant and varying oxy-fuel firing to control the furnace temperature profile. The constant air-fuel firing capacity level (say baseline level) will maintain a nearly constant NOx and particulate emissions while adjustments in oxidizing burner firing rate can be used as a furnace process control tool without affecting overall NOx or particulate emissions. This new approach can offer a precise process temperature control due to additional capabilities offered by oxidizing burners for fine adjustments in firing rate, burner/furnace stoichiometry and resulting process temperature. The degree of flow control offered by oxy-fuel firing is far more precise than the air-full firing used on traditional air-fuel regenerative furnaces.

A novel oxidizing burner construction to enable a high velocity stream of oxidizing combustion products. Due to relatively higher flame velocities of oxy-fuel flame, a stream of high velocity oxidizing products of combustion can be produced. The resulting momentum can be as much as 10 times greater than a cold oxygen stream used in previous oxygen-enriched air combustion methods such as disclosed in U.S. Pat. No. 5,203,859.

A retrofittable new concept to reduce NOx emissions from a production furnace.

A new NOx reduction method where increased heat transfer from oxy-fuel flame increases productivity while reducing NOx emissions. There are three reasons for the increased heat transfer: (1) there is an increased partial pressure of H2O and CO2 in the combustion chamber which enhances the rate of heat transfer; (2) as the air-fuel burners are fired in a fuel rich mode under the present invention—soot formation is enhanced which also increase the rate of energy transfer to the load; (3) with the use of oxidizing burners, the total flue gas exhaust volume is decreased (for the same fossil fuel firing rate) so any energy recovery devices associated with the furnace to provide preheated air as the oxidant will be more efficient, leading to higher air preheat temperatures.

A retrofittable new concept to fire oxy-fuel burner in the air-fuel furnace to maintain the desired fossil fuel firing capacity using a reduced flue volume. This is necessary when regenerators (due to plugging or other reasons) are not capable of handling the flue volume capacity resulting from air-fuel combustion solely.

Figure 3:
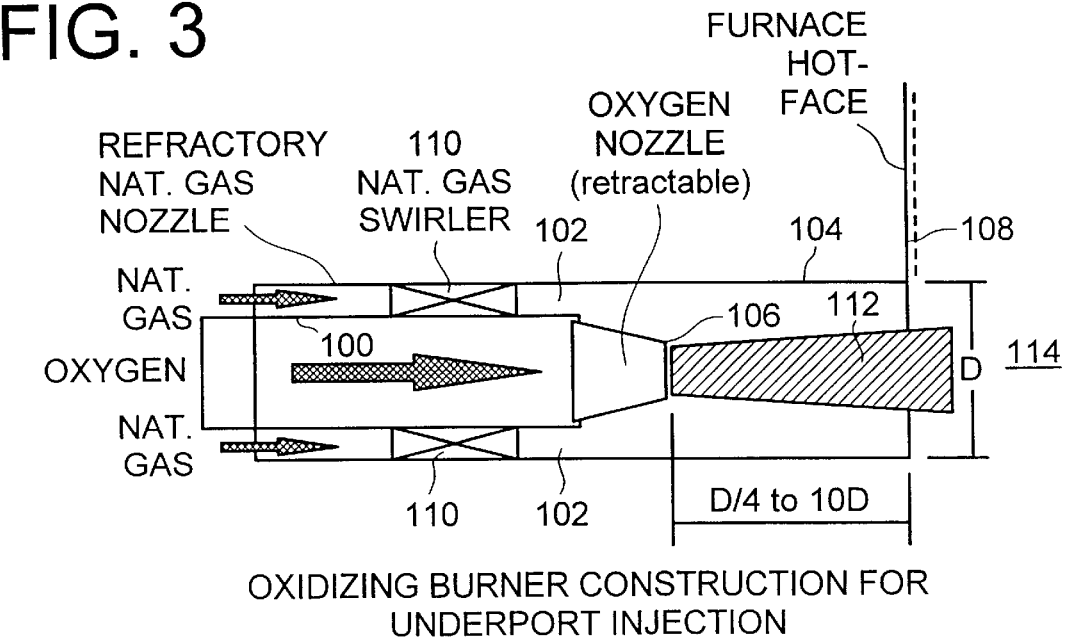
FIG. 3 is a schematic cross-sectional drawing of an oxidizing burner in accordance with the present invention.

Another important embodiment of the invention is the design of oxidizing oxy-fuel burner. The oxidizing burner can be oxygen-fuel oil burner. For simplicity, an oxygen-natural gas burner design is considered here. FIG. 3 illustrates a schematic of the inventive oxy-fuel burner construction. The design of this burner is based on injecting a very high velocity oxidizing flame into the melter combustion space. The oxidant velocity ranges from about 100 ft/s [30 m/s] to about 1000 ft/s [300 m/s]. The general direction is along the air-fuel flame length and at a slight angle α upwards to intersect the tail section of air-fuel flame. The angle α ranges from about 1° to about 30° for the flat bottom ports.

The higher velocity oxy-fuel flame is generally not chosen due to NOx concern, however, the current oxidizing burner is normally operated at very high equivalence ratio preferably from about 1.5 to about 12.5, therefore the overall NOx contribution from the oxidizing burner itself is relatively small. The NOx contribution is small because of the relatively low peak flame temperatures of the highly oxidizing burner.

The oxidizing burner design of the invention is very simple. A central conduit 100 is used for high velocity oxygen injection and an annular space 102 is used for natural gas. The oxygen conduit is sized to provide an oxygen injection velocity preferably greater than 100 ft/sec [30 m/s]. The burner preferably uses a standard refractory burner block 104 to form the annular natural gas passage. The natural gas flow is kept outside to provide an effective shield against furnace atmospheric nitrogen entrainment, which can react with the hot oxygen to form NOx. Further, the purpose is to send oxidizing products deep into the combustion space, therefore, the central high volume oxidizing jet is more capable of penetration than a weak low volume annular natural gas jet. It is also known from turbulent jet theory that the annular jet can decay much faster than the solid central jet. The oxygen conduit end 106 is kept at adjustable distance from furnace, hot-face 108 to create a proper flame momentum and flame stability.

As illustrated in FIG. 3, the central oxygen conduit 100 is preferably retractable in the axial direction to enable proper flame formation and momentum control. The amount of retraction preferably ranges from about D/4 to about 10D, where D is the internal diameter of natural gas refractory block 104. The annular natural gas flow in one embodiment is preferably swirled using a standard multiple vane swirler 110 to impart a slight swirl to the natural gas stream. This is done to create rapid combustion with the central oxygen stream and create a propulsion effect to shoot the oxidizing burner combustion stream 112 deep into the furnace combustion space 114. The goal is to send high velocity oxidizing burner flame into the furnace. The orientation for underport firing of the oxidizing burner is to keep the injection angle α very small (from about 1° to about 10° upward for flat bottom ports) for delayed intersection with the air-fuel flame. The range of oxygen and natural gas velocities are preferably each from about 200 to 800 ft/sec [60 to 200 m/s]. Depending on the air-fuel burner firing rate, port width, furnace width and oxidizing burner stoichiometric ratio, a careful selection of gas and oxygen velocities is made. A computational fluid dynamics (CFD) flow model is preferably applied to the furnace geometry and gas/oxygen velocities are chosen to enable oxidizing combustion products, from the oxy-fuel burner to intersect at the tail section of air-fuel flame.

An equivalence ratio of 0.6 to 1.00 for the air-fuel fired burner is determined in the present invention by considering that reducing the preheated combustion air rate below 0.6 equivalence ratio may create a very low velocity air-fuel flame (due to fixed port dimensions). Such a flame may be excessively long and could damage the furnace refractory (near the exhaust port and crown). The long flame length may be reduced by a certain extent by increasing the fuel injection velocity. In many furnaces however, the air-fuel burner nozzle exit diameter is not adjustable and therefore the fuel velocity is not variable at a given firing rate. In such a situation, furnace operation at reduced equivalence ratio becomes difficult due to the flame length control problem. The low limit of air-fuel burner equivalence ratio is limited by the air-fuel burner design, furnace width (for side-fired furnaces) and ability to adjust the air-fuel flame length (using higher fuel velocity) without damage to the furnace refractory. It is preferable to change the air-fuel burner nozzle (using smaller nozzle and higher fuel velocities) when lower equivalence ratio (0.6 to 1.00) is used. The lower equivalence ratio is typically used when the maximum reduction in NOx is desired. Another option is to use a variable area air-fuel burner nozzle to increase the fuel velocity during low equivalence ratio operation. If it is possible to reduce the port exit area dimensions (for example by blocking port area partially with refractory bricks), even lower air-fuel equivalence ratio (<0.6) can be used.

Figure 4:
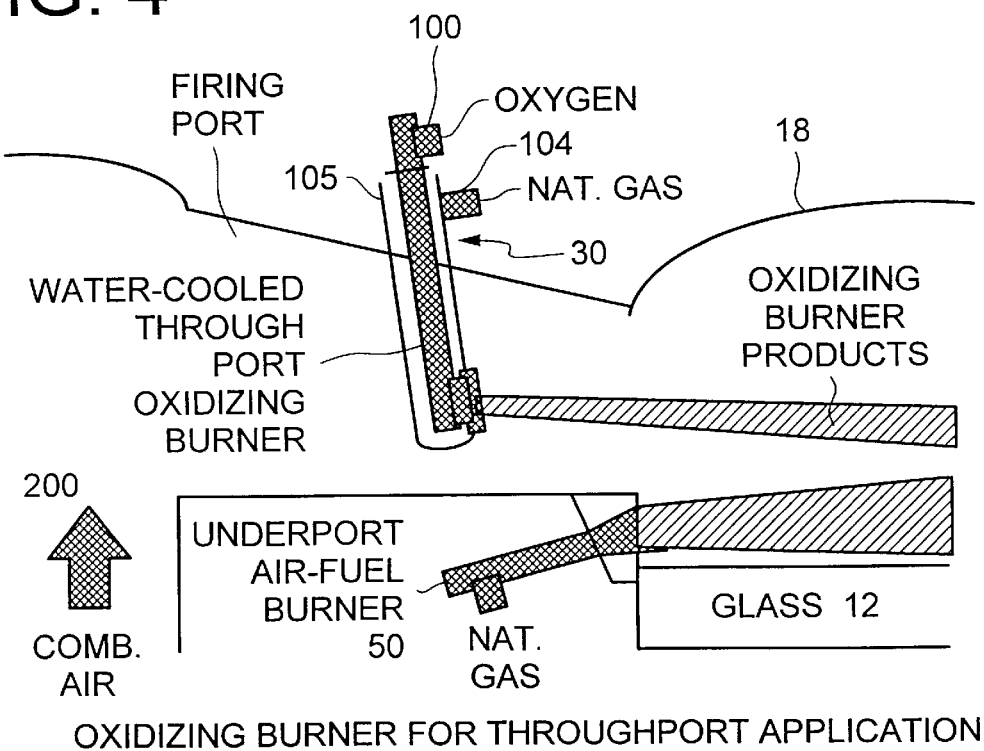
FIG. 4 is a schematic representation of a water-cooled through port oxidizing burner in accordance with the present invention.

The oxidizing burner firing configuration is adapted for different air-fuel burner firing configurations. The side-of-port firing is very common in float glass furnaces. Another industrially used configuration is an underpart air-fuel firing. For such a configuration with the present invention a throughport oxidizing burner 30 (water-cooled) is necessary. Once again, depending on the port width, single or multiple oxidizing burners may be preferred. This is shown in FIG. 4, wherein an air-fuel burner 50 is illustrated in underport position. The oxidizing burner flame characteristics are similar to the previous case involving underport injection. Here, the injection angle α is adjusted (from about −10° to about 30° to the glass surface) to allow intersection at the tail section of the air-fuel flame. The fuel and oxidant velocities of oxidizing burner are specifically calculated since the oxidizing burner flow stream is submerged in the preheated air stream. The effect of preheated combustion air 200 momentum is taken in account while calculating the oxidizing burner flame momentum and direction. This burner 30 has an oxygen conduit 100 and typically a fuel conduit 104 surrounding the oxidant conduit, but in addition has a water jacket 105.

The oxidizing burner 30 firing can be adapted to various other air-fuel burner firing configurations including overport firing, and endport firing for the U-type regenerative furnaces. In the case of recuperative or direct-fired furnaces, the oxidizing burner can be fired at an angle underneath the air-fuel burner (similar to side-of-port case, illustrated in FIG. 2).

The NOx emission reduction can be obtained by simply running the regenerative or recuperative furnace at lower stoichiometric ratio (equivalence ratio of 0.6 to 1.00) and operating the oxy-fuel oxidizing burner at desired equivalence ratio between 1.5 to 12.5). Lower or higher limits on stoichiometric ratio are not selected due to flammability limits of oxy-fuel combustion and undesirable increase or decrease of equilibrium flame temperatures.

The present invention has been described in various non-limiting embodiments, and those skilled in the art will recognize certain modifications to the illustrated methods and apparatus. These modifications are considered within the scope of the following claims.

What is claimed is:

1. An oxy-fuel burner comprising:
 a) a central conduit adapted to deliver an oxidant comprising greater than 21% oxygen, the central conduit having an outer surface;
 b) the central conduit positioned within a refractory burner block having an internal surface, forming an annular region between the outer surface of the central conduit and the internal surface of the refractory burner block, the annular region adapted to deliver a fuel, the annular region having positioned therein one or more fuel swirlers;
 c) the central conduit having a nozzle attached at a central conduit end, wherein either the nozzle or the central conduit are adapted to be adjusted axially.

2. Burner in accordance with claim 1 wherein the central conduit has an oxidant exit end, and the burner annular region is defined by a refractory nozzle, the refractory nozzle having a furnace hot face, the oxidant exit end being positionable from the furnace hot face by a distance ranging from about D/4 to about 10D, wherein D is a diameter of a burner flame exit region.

3. An oxy-fuel burner in accordance with claim 1 wherein the oxy-fuel burner is adapted to operate at an equivalence ratio ranging from about 1.5 to about 12.5.

* * * * *